(12) United States Patent
Finkelman et al.

(10) Patent No.: US 7,664,242 B2
(45) Date of Patent: Feb. 16, 2010

(54) SYSTEM AND METHOD FOR ANONYMOUS TELEPHONE COMMUNICATION

(75) Inventors: Eli Finkelman, Wilmington, DE (US); Meir Cohen, Wilmington, DE (US)

(73) Assignee: Tel-Tech Systems, Inc., Toms River, NJ (US)

( * ) Notice: Subject to any disclaimer, the term of this patent is extended or adjusted under 35 U.S.C. 154(b) by 908 days.

(21) Appl. No.: 11/393,971

(22) Filed: Mar. 30, 2006

(65) Prior Publication Data

US 2007/0263819 A1    Nov. 15, 2007

(51) Int. Cl.
*H04M 1/56* (2006.01)
(52) U.S. Cl. ................. 379/142.02; 379/88.21
(58) Field of Classification Search ............ 379/211.02, 379/88.2, 88.21, 142.02
See application file for complete search history.

(56) References Cited

U.S. PATENT DOCUMENTS

| | | | |
|---|---|---|---|
| 7,292,858 B2 * | 11/2007 | Forte | 455/445 |
| 2003/0147519 A1 * | 8/2003 | Jain et al. | 379/211.02 |
| 2004/0240642 A1 * | 12/2004 | Crandell et al. | 379/88.22 |
| 2006/0264205 A1 * | 11/2006 | Gibbs | 455/413 |

* cited by examiner

*Primary Examiner*—Creighton Smith
(74) *Attorney, Agent, or Firm*—Michael J. Feigin, Esq.; PatentLawNY.com

(57) ABSTRACT

The present invention comprises a system and method for masking the identity of a user of a calling telephone. Preferably an information processor is provided to receive over a public switched telephone network a telephone call from the calling telephone. The information processor receives from the user of the calling telephone a destination telephone number and a user-defined telephone number that is to be transmitted to a telephone at the destination telephone number. When the destination telephone answers, the user-defined telephone number is displayed.

19 Claims, 3 Drawing Sheets

SYSTEM AND METHOD FOR ANONYMOUS TELEPHONE COMMUNICATION

FIELD OF THE INVENTION

The present invention relates generally to communication, and, more particularly, to ensuring anonymity when communicating with a telephone handset.

BACKGROUND OF THE INVENTION

Until relatively recently, people were afforded a large degree of anonymity when communicating using telephones. It used to be that a caller who used an "old fashioned" telephone that had no display screen, dialed a telephone number to place a call over a public access switch network, and the receiving party used a similar telephone to answer the call. Using this prior art technology, unless the caller identified himself after the connection was made, the receiving party had no immediate way of knowing who was calling.

Telephones have became increasingly sophisticated and commonly include a display that, when configured with a service to display a caller's telephone number (known in the art as "Caller ID"), is capable of displaying the telephone number of a caller, even prior to the receiving party answering the call. A party with residential telephone service who does not wish to accept a call from a particular number, therefore, can simply glance at the display on his telephone to learn the caller's telephone number, and avoid answering the call.

Moreover, even if a receiver does not have a telephone equipped with a display, the receiver can still have determine the identity of the caller, for example, via services such as "*57 Call Trace," *69 Last Call Return," "Anonymous Call Rejection" and "Detailed Billing."

Caller ID service does not, however, ensure that parties who accept telephone calls know who the person is on the other end of the call. A person may use someone else's telephone to place a telephone call, and the receiver may answer under the belief that the person placing the call is actually the person who owns the telephone. In such case, as in the past, unless the caller announces himself, the receiving party cannot be certain who is placing a telephone call. Once the person speaks, however, his voice may be recognized and his identity revealed.

Telephone services, particularly Caller ID service, is more complicated and less reliable in the context of business telephone service. Many businesses, for example, use a private branch exchange ("PBX") that is a private telephone network in which a number of telephone lines are connected to a public switched telephone network. A PBX manages telephone communications for a plurality of telephones, including to enable telephones on the private network to make calls outside of the network. A PBX is cost-effective because far fewer public telephone lines are required than actual telephone units.

Typically in a business environment, when an employee places a call that is destined for a receiver outside of the private network, referred to herein as an "outside call," the recipient's telephone, if configured with Caller ID and a display, shows the telephone number that is provided by the business's private telephone network, such as managed by a PBX. Since the PBX manages the call, the telephone number that appears on the receiver's telephone display may be the private network telephone number of the user, and not the "actual" telephone number relating to a respective telephone line in the business. Thus, the telephone number appearing on the receiver's Caller ID display is not accurate.

The ability to manage the display of a telephone number on a Caller ID display is limited to those with access expensive technology, such as PBX. Without access to a private telephone network, a caller does not have the ability to control the number that appears on the receiver's Caller ID display.

SUMMARY OF THE INVENTION

The present invention comprises a system and method for masking the identity of a user of a calling telephone. Preferably an information processor is provided to receive over a public switched telephone network a telephone call from the calling telephone. The information processor receives from the user of the calling telephone a destination telephone number and a user-defined telephone number that is to be transmitted to a telephone at the destination telephone number. When the destination telephone answers, the user-defined telephone number is displayed.

Other features of the invention include altering the sound of the user's voice, recording a conversation between the user and the person answering the destination telephone number, and enabling playback of the recorded conversation at a later time.

Other features and advantages of the present invention will become apparent from the following description of the invention, which refers to the accompanying drawings.

BRIEF DESCRIPTION OF THE DRAWINGS

For the purpose of illustrating the invention, there is shown in the drawings a form which is presently preferred, it being understood, however, that the invention is not limited to the precise arrangements and instrumentalities shown. The features and advantages of the present invention will become apparent from the following description of the invention that refers to the accompanying drawings, in which.

DETAILED DESCRIPTION OF THE PREFERRED EMBODIMENTS

In one embodiment, the present invention includes a system and method that is operable to change a telephone number on a Caller ID display when a phone call is received. In this way, a telephone caller can remain anonymous. By manipulating (e.g., changing) the telephone number listed by a Caller ID service, individuals and/or business professionals have an ability to manipulate their identities and stay anonymous.

As used herein, the term "Caller ID spoofing" refers, generally, to controlling the telephone number that is displayed on telephone equipment that is enabled with Caller ID. The present invention enables Caller ID spoofing by providing a computer system that can be called and, in response to touch tone signals, enables a user to control the telephone number that is sent to the receiving telephone and, accordingly, affect the telephone number that appears on the receiver's Caller ID display. In addition to maintain anonymity by modifying a telephone number that appears on a Caller ID display, the present invention defeats popular telephone services such as "*57 Call Trace," "*69 Last Call Return," "Anonymous Call Rejection" and "Detailed Billing." In one example, private investigators can use Caller ID spoofing for pretext calls.

Figure 1:
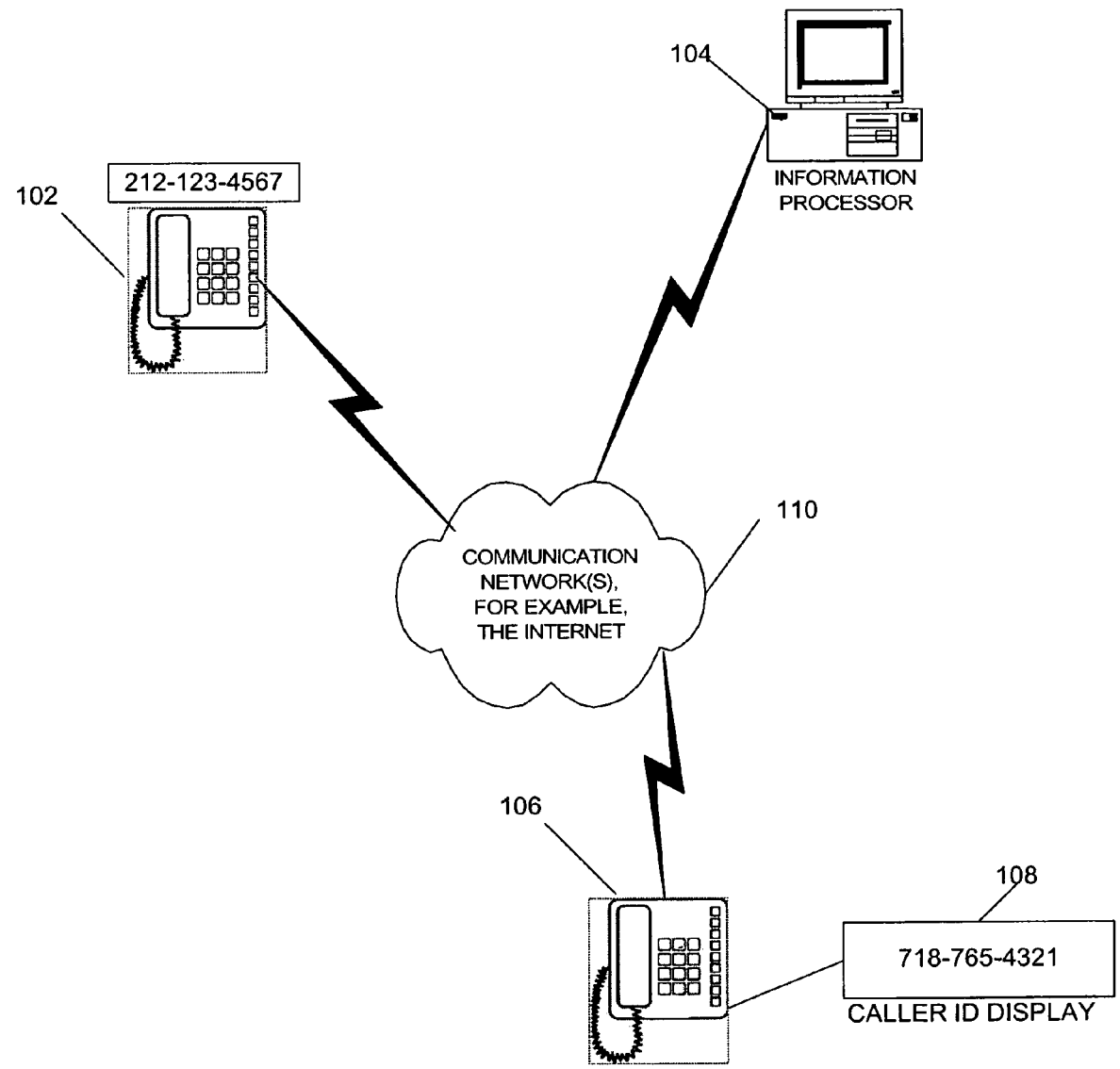
FIG. 1 shows an example hardware arrangement in a preferred embodiment of the present invention.

Referring now to FIG. 1, in accordance with a preferred embodiment, a caller of telephone 102 dials a telephone number that connects to an information processor 104 to call a receiver's telephone 106. In the example shown in FIG. 1, the caller's 102 telephone number is 212-123-4567. Once connected, a menu interface is provided by the information processor 104 that enables the caller 102 to instruct the information processor 104 of the receiver's telephone number, and a telephone number the caller would like sent (e.g., 718-765-4321). Preferably, the telephone number the caller 102 dials to connect to the information processor 104 is a toll-free number. Further, in a preferred embodiment, instructions provided to the information processor 104 are made via making touch tone selections on the caller's 102 telephone. In this way, no additional cost for placing the call to the information processor 104 is incurred, and no human intervention is required since the commands issued by the caller's 102 touch tone telephone are received directly by the information processor 104.

Once instructed, the information processor 104 places the telephone call to the receiver's telephone number and transmits the caller's 102 desired telephone number. When the receiver's telephone 106 rings, the telephone number that appears on the Caller ID display 108 is the number that the caller 102 provided to the information processor 104, in place of the caller's 102 actual telephone number. In the example shown in FIG. 1, the telephone number appearing on the receiver's Caller ID display 108 is 718-765-4321. Thus, telephone calls made in accordance with the teachings herein can be truly anonymous, enabling a caller to "spoof" his telephone number from the receiver. Unlike the prior art, the present invention enables anyone with access to a telephone to manipulate the telephone number that is transmitted over a public switched telephone network.

Figure 2:
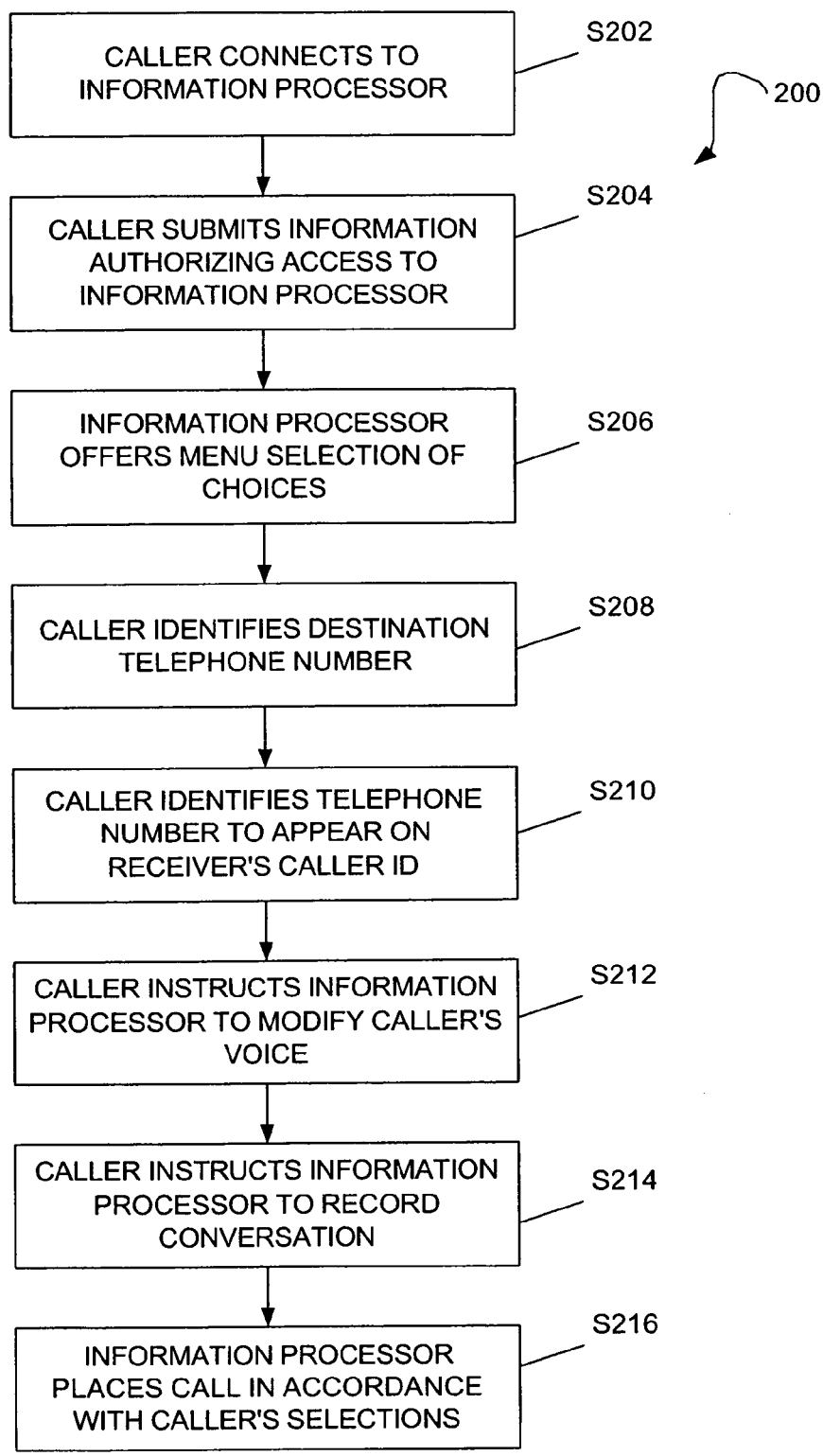
FIG. 2 is a flow chart illustrating example steps taken in accordance with an embodiment of the present invention.

FIG. 2 illustrates the functional elements of user terminal 4 and/or information processor 2 and that include one or more central processing units (CPU) 12 used to execute software code and control the operation of user terminal 4 or information processor 2, read-only memory (ROM) 14, random access memory (RAM) 16, one or more network interfaces 18 to transmit and receive data to and from other computing devices across a communication network, storage devices 20 such as a hard disk drive, floppy disk drive, tape drive, CD ROM or DVD for storing program code, databases and application data, one or more input devices 22 such as a keyboard, mouse, track ball, magnetic card reading device, bar code reading device, microphone or the like, and a display 24.

In a preferred embodiment, the various components of information processor 104 need not be physically contained within the same chassis or even located in a single location. For example, a storage device may be located at a site which is remote from the remaining elements of information processor 104, and may even be connected to a CPU across communication network 110 via a network interface. Information processor 104 preferably includes a memory equipped with sufficient storage to provide the necessary databases, forums, and other community services as well as acting as a web server for communicating hypertext markup language (HTML), FLASH, Action Script, Java, Active Server Pages, Active-X control programs. Information processor 104 is preferably arranged with components suitable for the expected operating environment of information processor 104. CPU(s), network interface(s) and memory and storage devices are selected to ensure that capacities are arranged to accommodate expected demand.

As used herein, the term, "module" refers, generally, to one or more discrete components that contribute to the effectiveness of the present invention. Modules can operate or, alternatively, depend upon one or more other modules in order to function.

In addition to spoofing telephone numbers, the present invention provides other features. For example, since the information processor 104 places telephone calls, it has the ability to record and store a telephone call and/or conversation. For example, using digital recording techniques, as known in the art, the information processor 104 can record a telephone conversation for future review. In a preferred embodiment, a menu choice is provided by information processor 104 to the caller 102 that enables the caller 102 to instruct information processor 104 to record the conversation.

Once a conversation is recorded, the caller can, at a future time, call the information processor and instruct the information processor 104 to replay the conversation.

In accordance with another feature, the present invention enables a caller 102 to change the way his voice sounds. Using known digital techniques for altering the pitch and character of a voice, information processor preferably enables caller 102 to sound like someone else. The caller 102 can select, for example, a male or female voice when making a call. This feature works in real-time and allows the caller to speak in a normal tone while the person on the other end hears the changed voice. This feature of the invention provides yet another way that anonymous telephone calling can be effected. The combination of Caller ID spoofing and voice modification, the caller 102 is ensured that his identity will not be available to the receiver.

In accordance with one business model of the present invention, a card is offered for sale that enables consumers of the present invention to access information processor 104, enter a personal identification number, and place a telephone call substantially as described herein. The cards can be configured to enable the buyer to a fixed number of telephone calls, or a predetermined amount of telephone time that a caller 102 can have.

It is recognized by the inventor that some regulations may expressly forbid Caller ID spoofing. In order to ensure the present invention is used lawfully, a user agreement is imposed on caller 102 that includes several security measures which includes the inability to dial toll free numbers or 911.

It is believed by the inventor that the present invention is useful in many contexts and by many different parties. For example, private investigators, law enforcement personnel, and skip tracers may lawfully use the invention to maintain anonymity when using a telephone.

The present invention is now further defined with reference to steps 200 illustrated in the flow chart shown in FIG. 2.

In step S202, a caller 102 connects to the information processor 104, preferably by calling a toll-free telephone number. Once connected the caller 102 submits a code, such as a personal identification number, that informs the information processor 104 that the caller 102 is authorized to access the information processor 104 (step S204). Authorization is typically provided in exchange for a payment. In step S206, the information processor 104 provides a menu of choices for caller 102 to make, preferably via his touch tone telephone keypad. Using his touch tone keys, the caller 102 identifies the destination telephone number of the receiver (step S208). Thereafter, the caller 102 identifies the telephone number he would like to have appear on the receiver's caller ID display (step S210). The caller 102 further instructs the information processor 104 to modify the caller's voice (step S212). Moreover, in step S214, the caller 102 instructs information processor 104 to record the conversation. Using the selections made by the caller 102, the information processor 104 places the telephone call (step S216).

Thus, as demonstrated in the example steps shown in the flow chart of FIG. 2, a caller 102 can ensure anonymity when calling a receiver, and can hear to the call again in the future.

Although the present invention has been described in relation to particular embodiments thereof, many other variations and modifications and other uses will become apparent to those skilled in the art. For example, although Caller ID displays are described with reference to telephones, other displays, such as computer displays or the like are capable of displaying a telephone number of a caller. Accordingly, any display that is capable of displaying a telephone number will operate to display the telephone number as defined by the caller 102.

Figure 3:
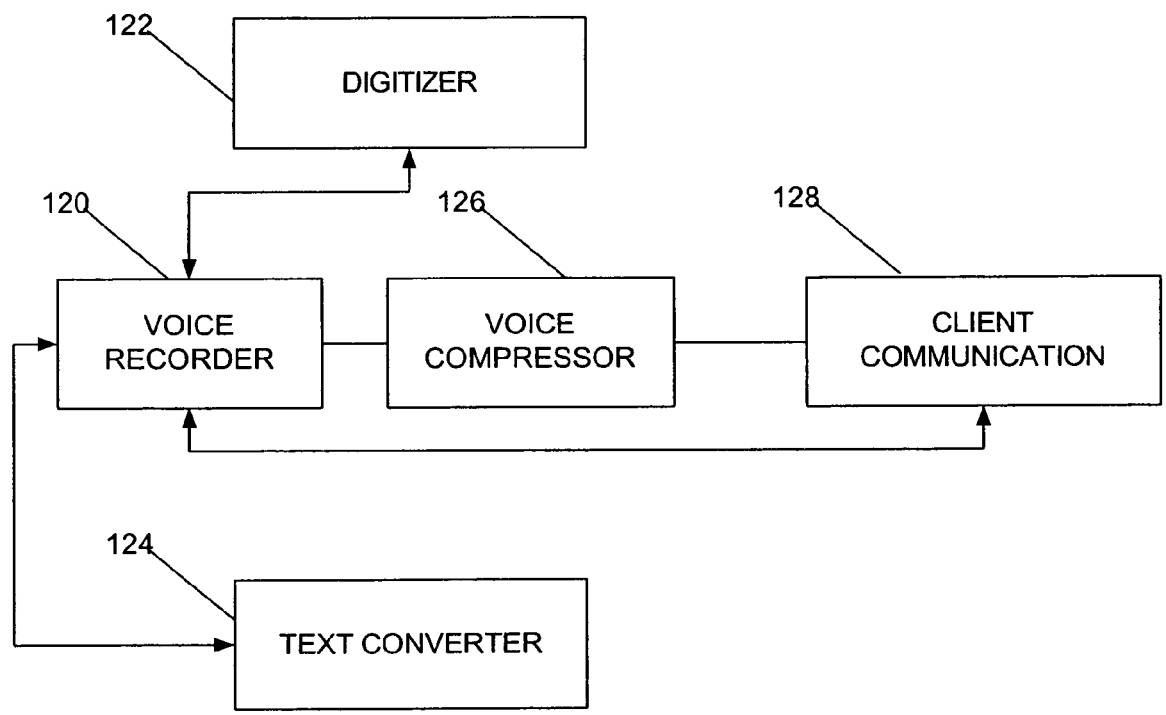
FIG. 3 is a block diagram illustrating modules to support additional features provided by the present invention.

The information processor 104 (shown in FIG. 1) may include, in addition to the functionality already described, certain hardware and software to effectuate and deliver the functionality shown in FIG. 3.

Thus, turning to FIG. 3, upon receiving an instruction from a user to record a conversation, the voice recording module 120 records the conversation and stores the recorded conversation in a memory (not shown) for later retrieval by the user. The voice recording can be done in analog form. Preferably however, the recorded conversation is routed to a digitizer 122 which digitizes the analog conversation and the digitized file can be then provided to a digital voice compression module 126 that reduces the size of the digital file to a file which is highly compressed in accordance with well known compression technologies known to those skilled in the art.

The compressed voice files generated by the voice compression module 126 can be provided to a client communication module 128 which is typically programmed to either play back the conversation to a user in accordance with one mode of operation. In accordance with another mode of operation, voice files are automatically sent to a user or subscriber, for example, by being e-mailed as a voice data to a predefined e-mail address, which may be that of the user or of a third party or parties. Thus, the system of the present invention also allows a person to record his or her own voice message (or dictation) and have the resulting voice file e-mailed as a compressed voice file to a voice transcribing service or services or have the voice file converted into text through use of voice recognition software. In addition, each voice file can be submitted together with identification information including the time of day, the date and the duration of the conversation, for easy recognition by the end user, e.g., a date/time stamp.

Module 124 is a text converter which in operation is actually a voice recognition module that analyzes the contents of the voice recording and converts the voice recording to text messages and the text messages are thereafter routed directly to the client communication module 128, in visually perceivable format to be provided to the client.

Other uses and products provided by the present invention will be apparent to those skilled in the art. It is preferred, therefore, that the present invention not be limited by the specific disclosure herein.

What is claimed is:

1. A system for masking the identity of a user of a calling telephone, the system comprising:

an information processor operable to receive over a public switched telephone network a telephone call from the calling telephone;

a menu module provided by the information processor and operable to automatically provide to the user of the calling telephone a choice related to at least a destination telephone number and a user-defined telephone number to display;

a telephone calling module provided by the information processor and operable to receive from the user of the calling telephone a destination telephone number, and further operable to call the destination telephone number; and a user-defined telephone number module provided by the information processor and operable to transmit to a telephone at the destination telephone number the user-defined telephone number that is defined by the user of the calling telephone, wherein the user-defined telephone number is different from the calling telephone's telephone number;

wherein in response to selections made by the user in the menu module, the information processor masks the identity of the calling telephone by calling the destination telephone number and transmitting the user-defined telephone number as the telephone number of the calling telephone.

2. The system of claim 1, further comprising a voice altering module provided by the information processor that is operable to alter the sound of the user's voice.

3. The system of claim 2, wherein the menu module further includes a choice for altering the sound of the user's voice, and in response to the user selecting the choice for altering the sound of the user's voice, the voice altering module alters the sound of the user's voice.

4. The system of claim 1, further comprising a conversation recording module provided by the information processor and operable to record a conversation between the user and a person answering the destination telephone number.

5. The system of claim 4, wherein the menu module further includes a choice for recording a conversation, and in response to the user selecting the choice for recording the conversation, the conversation recording module records a conversation between the user and the person answering the destination telephone number.

6. The system of claim 4, wherein the menu module further includes a choice for playing back a recorded conversation.

7. The system of claim 1, further comprising a payment module provided by the information processor and operable to accept from the user a payment.

8. The system of claim 1, further comprising a card that, when purchased by the user, authorizes the user to call the information processor and make selections in the menu module to instruct the information processor to call the destination telephone number and transmit the user defined telephone number as the telephone number of the calling telephone.

9. A method for masking the identity of a user of a calling telephone, the method comprising:

receiving over a public switched telephone network a telephone call from the calling telephone;

automatically providing to the calling telephone choices that are related to at least a destination telephone number to call and a user-defined telephone number to display;

receiving from the user a destination telephone number;

receiving from the user a user-defined telephone number for transmitting to a telephone at the destination telephone number, wherein the user-defined telephone number is different from the calling telephone's telephone number; and placing the call to the destination telephone number as a function of the choices received by the user.

10. The method of claim 9, further comprising altering the sound of the user's voice in response to the user selecting the choice to alter the sound of the user's voice.

11. The method of claim 9, further comprising recording a conversation between the user and a person answering the destination telephone number.

12. The method of claim 11, further comprising playing back the recorded conversation.

13. The method of claim 10, further comprising receiving a payment from the user.

14. A system for enabling a user to record his or her telephone calls or voice messages, the system comprising:

an information processor operable to receive over a public switched telephone network a telephone call from a user calling from a calling telephone;

a menu module provided by the information processor and operable to provide to the user an option to record the telephone call;

a telephone calling module provided by the information processor and operable to selectively receive from the user a calling telephone destination telephone number;

a telephone call placing module which routes a telephone call from the calling telephone to a destination telephone and records the conversation upon the selection by the user of a recording option; and a storing module which stores a recorded voice file of the telephone call and an associated communication unit which transmits a copy of the recorded voice file to the user.

15. The system of claim 14, wherein the recorded voice file is sent to a predefined e-mail address.

16. The system of claim 15, wherein the recorded voice file is sent in text form.

17. The system of claim 15, wherein the voice file is sent in the form of a compressed audio file.

18. The system of claim 14, wherein the recorded voice file is accompanied by an information header that includes a date and time stamp.

19. The system of claim 14, wherein the menu module further includes a choice for playing back a recorded conversation.

* * * * *